(12) United States Patent
Atanassov et al.

(10) Patent No.: US 8,333,941 B1
(45) Date of Patent: Dec. 18, 2012

(54) SPRAY PYROLYSIS SYNTHESIS OF MESOPOROUS NBRUYOZ AS ELECTROCATALYST SUPPORTS IN FUEL CELLS

(75) Inventors: Plamen Atanassov, Albuquerque, NM (US); Elise Switzer, Santa Fe, NM (US); Datye Abhaya, Albuquerque, NM (US); Timothy Olson, St Golden, CO (US); Daniel Konopka, Albuquerque, NM (US); Svitlana Pylypenko, St Golden, CO (US); Timothy L Ward, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 472 days.

(21) Appl. No.: 12/581,414

(22) Filed: Oct. 19, 2009

Related U.S. Application Data

(60) Provisional application No. 61/196,498, filed on Oct. 18, 2008.

(51) Int. Cl.
 *C01G 31/00* (2006.01)
(52) U.S. Cl. ............. 423/62; 423/22; 423/68; 252/500; 252/518.1
(58) Field of Classification Search ....... 252/500–518.1; 423/445 R, 22, 62, 68
See application file for complete search history.

(56) References Cited

U.S. PATENT DOCUMENTS

2003/0205853 A1* 11/2003 Yang et al. .................... 264/603
2011/0293941 A1* 12/2011 Chaumonnot et al. ........ 428/404

OTHER PUBLICATIONS

Konopka et al. ("Nanostructured Mesoporous NbRuyOx as a Catalytic Support for Fuel Cells." ECS Transactions, 19(27) p. 117-125, presentation at the SF meeting May 24-29, 2009).*
Miyazaki et al. ("Synthesis and photocatalytic activities of MnO2-loaded Nb2O5/carbon clusters composite materials." Microporous and Mesoporous Materials, 118, p. 518-522, online Sep. 11, 2008).*
Hernández et al. ("Aerosol-Assisted Synthesis of Magnetic Mesoporous Silica Spheres for Drug Targeting" Chem. Mater., 19(14), p. 3455-3463, online pub Jun. 15, 2007).*
Yang et al ("Block Copolymer Templating Syntheses Mesoporous Metal Oxides with Large Ordering Lengths and Semicrystalline Framework" Chem. Mater., vol. 11, pp. 2813-2826, online Sep. 29, 1999).*
Antonelli et al. ("Synthesis of a Stable Hexagonally Packed Mesoporous Niobium Oxide Molecular Sieve Through a Novel Ligand-Assisted Templating Mechanism" Angewandte Chemie, 35(4), p. 426-430, online Dec. 22, 2003).*
Yuan et al. "Mesoporous niobium oxides with tailored pore structures" J Mater Sc, 48j, p. 6278-628, online Aug. 13, 2008.*

* cited by examiner

*Primary Examiner* — Mark Kopec
*Assistant Examiner* — Tri V Nguyen
(74) *Attorney, Agent, or Firm* — Gonzales Patent Services; Ellen M. Gonzales

(57) ABSTRACT

Mesoporous conductive niobium and niobium-ruthenium particles and methods for forming the same are described. In some cases the particles are suitable for use as a fuel cell catalyst. The described aerosol-based synthesis method allows for single step formation and processing of the particles.

5 Claims, 7 Drawing Sheets

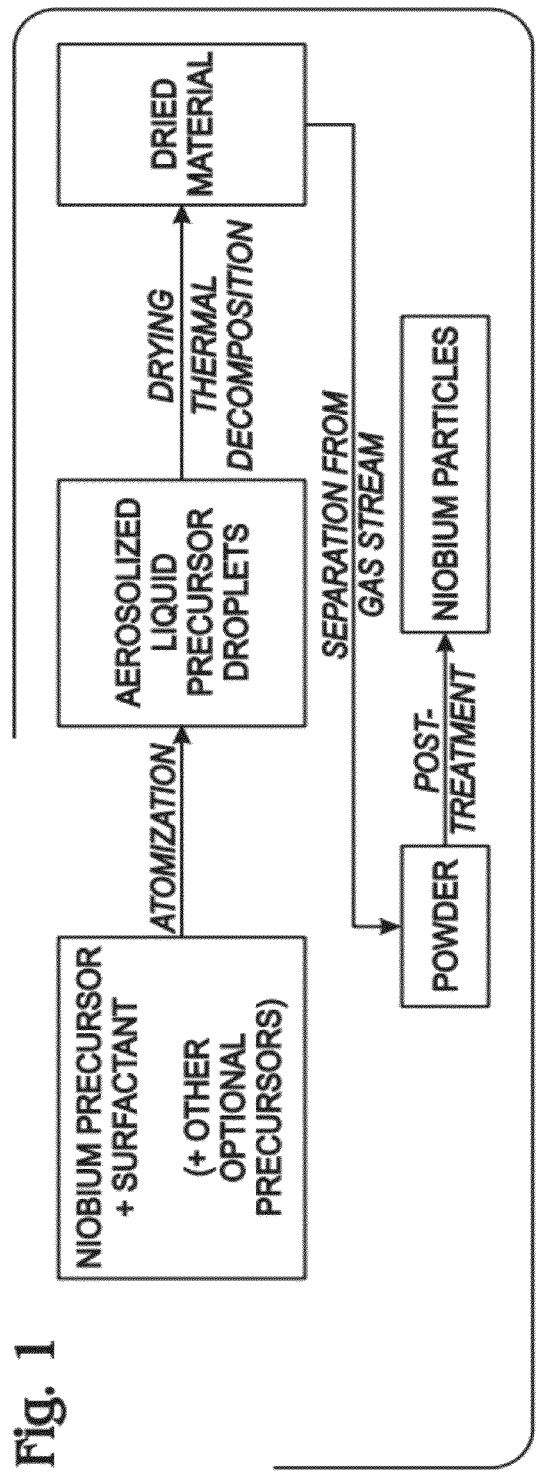
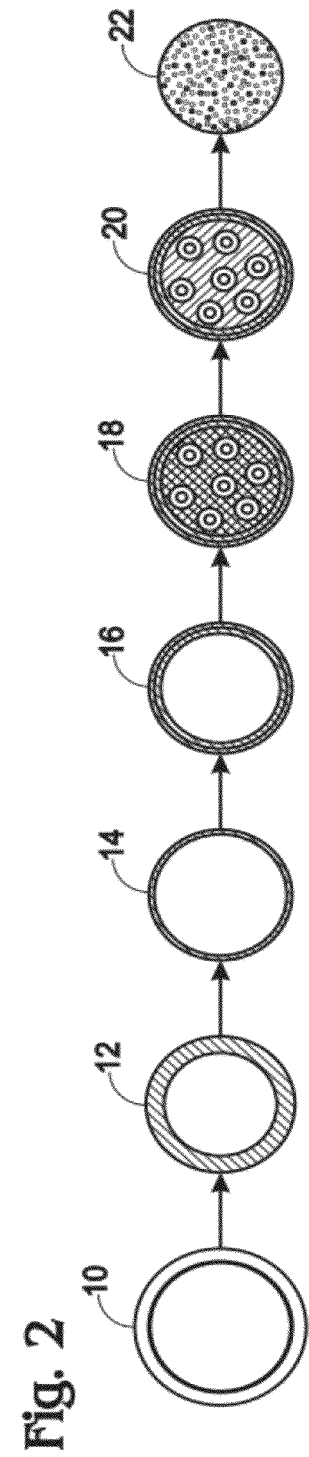
Fig. 1
Fig. 2

SPRAY PYROLYSIS SYNTHESIS OF MESOPOROUS NBRUYOZ AS ELECTROCATALYST SUPPORTS IN FUEL CELLS

CROSS-REFERENCE TO RELATED APPLICATIONS

The following application claims benefit of U.S. Provisional Application No. 61/196,498, filed Oct. 18, 2008, which is hereby incorporated by reference in its entirety.

BACKGROUND

Fuel cell research has largely been dominated by discussion of possible ways to utilize evermore expensive platinum electrocatalysts. In $H_2$ or alcohol based fuel cells where hydrogen is the ultimate electron source, platinum remains the definitive performer. At the anode, the current state of the art utilizes decorated nanoparticles of Pt/Ru alloy phase supported on high surface area carbon blacks [(Svitlana Pylypenko, 2009)]. It is generally believed that the improved fuel oxidation and enhanced resistance to CO poisoning seen with Pt/Ru is a result of the bi-functionality of the material [(Debra R. Rolison, 1999) (K. Sasaki, 2008)].

Carbon blacks have traditionally been used as the catalytic support for PtRu due to their excellent electronic conductivity and high surface areas ranging from 150 to 1200 $m^2/g$. The outer surface of the most commonly used carbons is graphitic with a low degree of oxidation, while the interior remains amorphous and especially susceptible to corrosion. See, e.g., Borup, R. et al, Chemical Reviews 2007, 107 (10), 3904-3951; and Kinoshita, K., Carbon: Electrochemical and Physicochemical Properties. Wiley: New York, 1988. There are three primary means of failure of carbon as a catalytic support. The first develops from percolation effects in the conductive carbon matrix as the material shifts and its simple morphology is unable to maintain as many points of electrical contact among particles, resulting in ohmic losses. Because carbon does not interact with the catalyst, kinetic losses also occur when platinum particles agglomerate and migrate around and off of the support surface, leading to sintering and loss of catalyst/support contact. Consequently, platinum and ruthenium have been shown to detach from the carbon and migrate across the ion exchange membrane [(Karl J. J. Mayrhofer, 2008) (Wu Bi, 2008) (Hector R. Colon-Mercado, 2005)]. Finally, carbon forms surface oxides which create a hydrophilic interface and lead to flooding of the support, ultimately hindering fuel flow to the catalyst.

Carbon supports do not participate in the catalytic oxidation/reduction reactions and offer low stability, leading to degradation of the fuel cell. Despite this, very few reports have discussed the alternatives to carbon. In some studies, because of their lesser conductivities [(M. Vettraino, 2001) (M. Vettraino M. L., 2000)], small amounts of strongly oxidizing metals have been used [(Brenda L. Garcia, 2007) (Kyung-Won Park, 2007)]. Alternatively, small to moderate weight percents of metal oxides supported on carbon are implemented as pseudo-supports for catalyst [(K. Sasaki, 2008)].

BRIEF DESCRIPTION OF THE DRAWINGS

FIG. 1 is a flowchart showing an exemplary method of aerosol synthesis of niobium oxide particles.

FIG. 2 is a flowchart showing the changes experienced by a particle during the pyrolysis and post-treatment of metal-oxides.

DETAILED DESCRIPTION

According to an embodiment the present disclosure provides a novel method of aerosol synthesis of conductive niobium oxide and oxide family particles suitable for use as electrocatalysts supports, among other things. According to various specific embodiments, two novel mesoporous materials, niobium oxide and niobium oxide with 12% ruthenium (by weight, metal basis), are produced and described. As described, the niobium and niobium-ruthenium particles have a stable, open mesoporous structure with a high surface area. According to further embodiments, the novel particles described herein may be further modified, such as by decoration with catalytic material so as to produce a novel electrocatalytic material.

Figure 8:
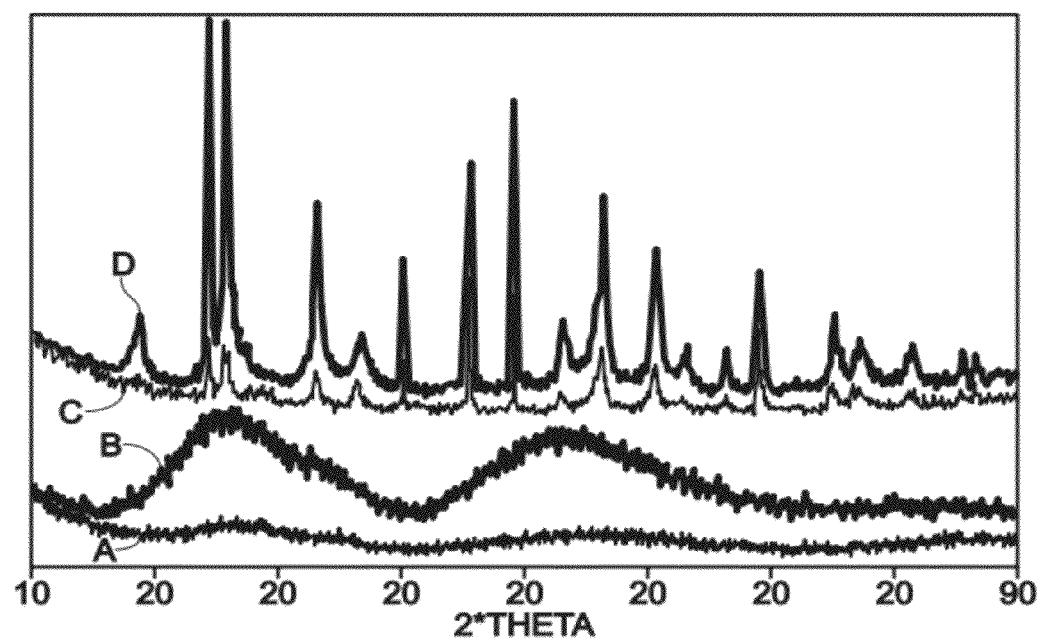
FIG. 8 is X-ray Diffraction Patterns from 10-90 degrees (2*theta) for NbOx-Dry-Air (A) & $NbRu_yO_z$-Wet-$N_2/H_2$ (B), as well as both samples after additional heating at 900° C. for 5 hours (C & D, respectively).

The spray pyrolysis (SP)-based methods of forming niobium particles with and without ruthenium content disclosed herein a have the ability to address needs is various commercial and non-commercial fields including fuel cell applications, electrochemical capacitors, solar cells, resistors and other electrical devices. In particular, SP is well-suited to effectively utilize evaporation induced self-assembly (EISA) of amphiphilic templates to synthesize mesoporous materials with controlled pore size and mesostructure [(Li Yuan, 2008) (C. Jeffrey Brinker, 1999) (Peidong Yang, 1999)]. Spherical particles, each with interior mesoporosity, represent a hierarchical structure when packed together, with multiple transport pathways and potential for low gas transport resistance. The purity, composition and uniformity of precursor solutions for SP are highly controllable, and that control is also reflected in the properties of aerosol droplets produced from the solution [(Yoshihide Senzaki*, 1995)(*R. Romero*, 2004)]. Each droplet within such an aerosol can be viewed as an independent micro-reactor with homogeneously mixed components and minimal internal diffusion resistance [(*Gary L. Messing*, 1993)]. Furthermore, the total reaction time is relatively short in SP reactor systems, usually in the range of 1-20 seconds or tens of seconds. SP also has excellent potential as a scalable process.

An exemplary method of aerosol synthesis of niobium oxide particles is shown in FIG. 1. As shown, initially a solution containing niobium precursor, one or more surfactants and one or more solvents is atomized using a polydisperse aerosol generator in order to form aerosolized liquid precursor droplets. In some methods, the initial solution may further contain precursor of other materials which are to form part of the final particle. The droplet material is dried to allow for removal of solvent and is then heated until thermally decomposed. The dried material is then separated from the gas stream via a porous membrane filter, which may, for example, be maintained at an elevated temperature in order to prevent water collection. The powder is then cooled to room temperature, collected, and subjected to post-treatment.

The changes experienced by a particle during the pyrolysis and post-treatment of metal-oxides are depicted in the illustration of FIG. 2. Aerosolization produces homogeneous liquid droplets of the same composition as the precursor solution minus the solvent and surfactant. At 10, evaporation of solvents from the droplets then proceeds, leading to solute precipitation. Because solvent evaporation occurs from the droplet surface, solute concentration gradients develop inside droplets that typically results in precipitate or solid formation first at the droplet surface (as shown at 12). For the same reason, during EISA in evaporating droplets, concentration gradients of the surfactant (P123) will develop that trigger the surfactant liquid crystalline (LC) phase transformations, usually first at the surface of the droplet. Continued solvent evaporation leads to the propagation of surfactant LC transitions into the interior of the droplet. Much of this may happen even before droplets enter the furnace zone. The higher temperatures of the heated zone complete solvent evaporation, and may drive thermal decomposition of the precursor compounds, effectively locking in any surfactant-related mesostructure that has developed. The LC mesostructural phases that form depend on the particular phase behavior of the surfactant, and the concentrations that develop during solvent evaporation. For the case of P123 under the conditions employed here, electron microscopy indicates that a lamellar phase forms at the surface first as shown at 14), followed by a wormlike or hexagonal mesophase in the interior of particles, as shown at 18 and in greater detail in FIGS. 3 and 4. If the collected powder receives the proper post-treatment, the process yields particles with fully exposed, mesoporous interiors (as shown at 20).

It should be appreciated that this process provides the opportunity to select and/or otherwise control a wide variety of factors related to the particles that are formed including, but not limited to composition, morphology, porosity, conductivity, and degree of phase mixing or phase separation. For example, by altering the initial step to include the appropriate metal precursors, the niobium oxide particles of the present disclosure can be decorated with one or more selected materials including, but not limited to, platinum, ruthenium, other platinum group metals, and other oxides. Alternatively, these particles can be formed to comprise or consist of substituted or doped niobium particles by including other materials into the initial precursor solution before spray pyrolysis. Additional materials can also be included in the initial aerosol processing steps to form particles having the desired characteristics. For example, when forming an electrocatalyst, platinum precursor, niobium precursor, and carbon slurry can be simultaneously aerosol processed to produce, for example, platinum-decorated carbon-niobium oxide particles in a single-step. Furthermore, the specific amounts of each component can be varied to produce particles with very specific structure and chemistry.

As stated above, the TEM micrographs of FIGS. 3 and 4 are synonymous with illustration 18 of FIG. 2: NbRuyOz particles collected directly from the filter paper show a visible mesoporous interior isolated by 2-3 lamellar layers. Those layers collapse upon removal of their surfactant scaffolding and partially sinter when this material is calcined in air, as do the structural walls of the interior, resulting in larger, more visually distinct pores, as also seen in FIG. 5 Residual organic material from any remaining surfactant, effectively sealed into the particle, is unable to escape and contributes to wall thickening. Many larger particles rupture and split due to the greater pressure exhibited by an increasing ratio (V/AS) of organics-rich volume to decomposed droplet surface area (See, e.g. FIG. 6). In this case, the particle surface condenses and becomes impermeable from complete thermal decomposition during calcination before volatile surfactant and chlorides can escape to the atmosphere. The pressure exhibited by these trapped species during heating soon splits larger particles into fragments, while some of the interior mesostructure remains apparent. However, if the lamellar layers are first etched with 0.3Maq. H2504 before calcination/reduction, EDS shows no evidence of retention of these organics. Instead, permeable particles of un-ordered, 3D wormhole mesoporous structure result, as shown in FIG. 7. It should be noted that in all cases, EDS shows residual chloride to be <2% immediately after spray pyrolysis, and <1% after acid & DI washing.

The nanoscopic features of these materials make them especially sensitive to chemical and thermal treatments. This, as well as the significantly lower energy of vaporization of ruthenium compared to niobium [(J. M. Jaksic, 2008) (T. B. Massalski, 1990)], are both well observed by the difficulty described earlier in the synthesis of an intermetallic phase. The highly sensitive, inverse correlation observed between the degree of Nb/Ru phase separation and electrical conductance, combined with XRD and XPS results, are telling of the nature of the NbRuyOz material. In a study by Yoon et al. [(Dong-Soo Yoon, 2001)], it was observed that tantalum oxide, a material with very similar properties to niobia, exhibited enhanced electrical conductance when phase mixed with ruthenium. Also similar to NbRuyOz powder, XRD studies showed that the presence of ruthenium caused enhanced thermal stability of a reduced form of tantalum oxide to temperatures as high as 800° C. in air. This was partially attributed to the presence of chemically strong Ta—Ru—O bonds. In this system, Yoon et al. identified that the thermodynamic driving force for the competing oxidations, TaOx→Ta2O5 &

RuOx→RuO2, were roughly equal. But the kinetic barrier for nucleation of crystalline Ta2O5 from amorphous TaOx is much greater than that of RuO2 from RuOx which already exists as a nanocrystalline phase. Indeed, TEM studies confirm that RuOx readily exists as nanocrystallites in most of the NbRuyOz samples discussed. Because XPS results support the presence of a mixed oxide phase as well as RuOx phases, it is reasonable to assume that similar phenomena are responsible for the electrical and thermal properties exhibited by NbRuyOz. Under this reasoning, the XRD results shown in FIG. 8, which do not match any one expected pattern for various valences of niobia or ruthenia, are showing the suppression of niobia crystallite formation & growth due to ruthenium. It should be noted that distinguishing contributions of niobium and ruthenium oxides in XRD can be difficult because many of their strong peaks are known to overlap, and because the ruthenium content is so low.

As shown herein, spray pyrolysis can be used to successfully synthesize poly-disperse (20 nm-1.6 μm), amorphous, single metal and bi-metal oxides of variations of niobia. Low temperature spray pyrolysis processing establishes nano and micron scale particle morphology, providing ideal conditions for rapid evaporation induced self-assembly of mesopore-forming surfactant as well as an environment of homogeneously distributed precursor at the time of thermal decomposition. Furthermore, the final morphological, compositional, and electrical properties of the end product can be controlled by varying the post-processing steps (e.g., by manipulating the conditions for acid washing or heating under different atmospheres).

According to yet another embodiment, the present disclosure provides a novel fuel cell catalyst and method for forming the same. Niobium oxide represents a material potentially suitable for replacing carbon's role as catalytic support in membrane fuel cells [(Bansal, 1994) (Brenda L. Garcia, 2007)]. According to its largest producer, Cabot, over 50 million pounds of niobium products are produced annually. Its most common applications involve products in which high corrosion resistance and thermal stability are required. These include use in high strength steel alloys such as jet-engine components, steam turbine blades, and superconducting magnets. Niobia, in particular, is seeing increased use as a dielectric material in resistors and capacitors. Literature has shown that niobia can play a complimentary role in the catalysis of oxygen reduction [(K. Sasaki L. Z., 2008) (Kyung-Won Park, 2007)], hydrogen oxidation [(S. Guerrero, 2007)], and methanol oxidation [(K. Sasaki, 2008) (Brenda L. Garcia, 2007)], wherein Pt activity is enhanced depending upon the form and quantity of the metal oxide. The design requirements of niobia as a superior replacement of carbon supports are rigorous. It must have a comparably high surface area, exhibit a degree of catalyst stabilization, have minimal gas transport resistance, be electrically conductive, and have the proper balance of hydrophobic surface chemistry so as to avoid inhibiting levels of hydration. Furthermore, incorporating ruthenium in the niobium oxide matrix as a NbRu alloy provides direct means of softening the line between catalyst and support, and encouraging chemical stability between the two.

In particular, acid wetting of a Nb/12 wt % Ru precursor followed by reduction in $N_2$/10% $H_2$ at 400° C. results in a potential fuel cell electrode material of inter-metallic niobia & ruthenia with enhanced electrical conductivity beyond that of Nb(V). This final mixed phase has been shown to be thermally stable and to exhibit electrochemical behavior, oxidizing methanol in the absence of platinum catalyst.

The intrinsic properties of $NbRu_yO_z$ suggest that this material can be utilized in fuel cells as a reactive support for electrocatalyst.

According to a specific exemplary embodiment, a precursor material was formed as follows: NbCl5 powder was acquired from Sigma-Aldrich, RuCl3 from Fischer Scientific, and Pluronic-123 (nonionic triblock co-polymer) from BASF. All materials were used as received. In the synthesis of mesoporous Nb2O5, 1 g of P123 was dissolved in 10 g of ethanol. Added to this was 2.6 g of NbCl5, after which the entire mixture was stirred for 10 min until all NbCl5 was dissolved, yielding a transparent solution. A similar niobium material doped with 12% Ru by weight of metals, hereafter referred to as NbRuyOz, was prepared by including 1 g of H2O and 0.385 g RuCl3 after 22 g ethanol, 2 g P123, and 3.70 g NbCl5. The small amount of additional water was necessary to thoroughly dissolve the RuCl3 into solution.

According to an exemplary embodiment, the spray pyrolysis apparatus comprises three separate sections. A TSI Inc. poly-disperse aerosol generator (model 3076) utilizes a single inert gas inlet to atomize the precursor solution, producing aerosolized liquid precursor droplets. A three-zone horizontal furnace spanned by a 3 inch outer diameter mullite tube from Coorstek, into which the aerosol stream feeds, is responsible for drying and thermal decomposition of the droplet material. The three-zone horizontal furnace with an effective heated length of 3 ft. was set to provide a 200° C. temperature profile, determined by thermocouple measurement at sequential points inside the tube. Precursor solutions were fed into the aerosol generator from an Ehrlenmeyer flask and carried through the tube as an aerosol using N2 carrier gas at 1.5 SLM (standard liters per minute). Collection was achieved with a porous membrane filter (HT-Tuffryn 450 Disk Filter, 0.20 μm pore size) to separate the dried material from the gas stream. The filter temperature was maintained at approximately 100° C. to prevent water collection.

According to a specific exemplary embodiment, the bulk sample was divided into several smaller groups. Post-treatment given to samples containing only niobia is similar to what has previously been reported in literature for templated Nb2O5 via sol-gel synthesis [(Li Yuan, 2008) (Byongjin Lee, 2002) (Bansal, 1994) (Junko N. Kondo, 2002) (Peidong Yang, 1999)]. This involved an acid wash in excess 0.3M H2SO4 solution followed by a water rinse, and then drying in ambient air and calcination in air (ramp at 10° C./min to 400° C., then held for 4 hours). Separate cases in the literature show acid washing and calcination to each be effective in the removal of amphiphilic surfactants, including P123 [(Peidong Yang, 1999) (David M. Antonelli, 1996)]. In our case, both were necessary to fully expose the interior mesoporosity of the material.

In this embodiment, the post treatment steps of samples containing niobium and ruthenium was altered compared to pure niobium. For example, some washing steps were intensified or omitted depending on their benefits. Accordingly, in initial experiments, NbOx-Dry-Air, contained no Ru, received no acid wash and was calcined in air. NbRuyOz-Wet-N2/H2, initially contained 1:8 Ru to Nb, received only enough acid wash solution as to be wetted, and was reduced under N2/H2 atmosphere in distilled water. For materials with ruthenium, a distilled water rinse was withheld until after heat treatment to ensure the stability of the mesopores and particle morphology. According to various embodiments, calcination may be performed in an environment of air, as well as a reducing environment of N2 with 10% H2, both ramped at 10° C./min to 400° C., then held for 4 hours.

(Hereafter, weight percent of ruthenium is reported relative to metal content, irrespective of oxygen content.)

Of the two niobium oxide parent samples, one of pure niobium and another containing 12 wt % ruthenium, both appeared visually indistinguishable in SEM as collected directly from the filter paper after spray pyrolysis at 200° C. Collected particles were poly-dispersed, ranging from roughly 50 nm to 4 µm. SEM-EDS reports an oxygen content equivalent to $Nb_2O_5$, and detects ~12 wt % Ru content in NbRuyOz, verifying retention of the more volatile metal-oxide. Because spray pyrolysis often involves very small particles at elevated temperatures, components with significant vapor pressures at the processing conditions can undergo evaporative loss, which can result in composition changes in multicomponent particles if one component is more volatile than another [(Yoshihide Senzaki, 1995) (Gary L. Messing, 1993)]. For niobium oxide and ruthenium oxides, the higher oxidation state ($Nb_2O_5$) is significantly more volatile than the lower oxidation state ($NbO_2$). For such materials, use of an inert or mildly reducing gas stream can minimize evaporative loss by stabilizing the lower oxidation state(s). However, this can be compromised by any oxidizing impurities in the gas or air leaking into the system.

Specific non-limiting examples of particles formed using the above-described methods are shown and described herein. For the purposes of this disclosure, the exemplary particles are named according to the metal oxide(s) of the parent sample and the post-treatment received. Accordingly, the exemplary particles are identified herein as NbOx-Dry-Air, NbOx-Dry-N2/H2, NbRuyOz-Dry-Air, NbRuyOz-Dry-N2/H2, NbRuyOz-Wash-Air, NbRuyOz-Wash-N2/H2, and NbRuyOz-Wet-N2/H2.

Figure 9:
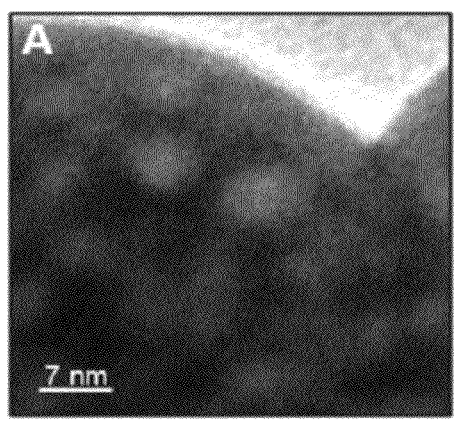
FIG. 9 is a TEM of $NbRu_yO_z$-Dry-Air calcined without a washing step.
Figure 10:
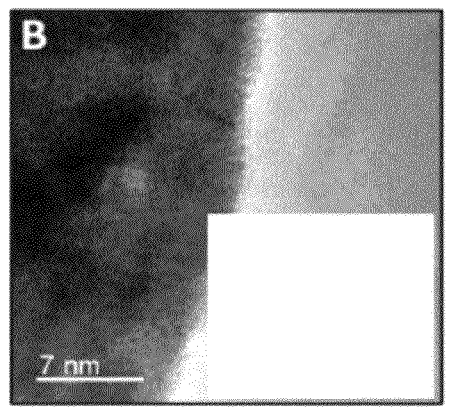
FIG. 10 is a TEM of lattice fringes of crystalline niobia formed in $NbO_x$Dry-$N_2/H_2$
Figure 11:
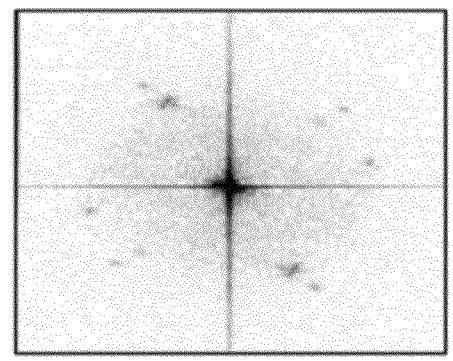
FIG. 11 depicts the an analysis of the lattice fringes shown in FIG. 10.

NbOx-Dry-Air was calcined in air at 10° C./min to 400° C. for 4 hours, without any acid washing step. A similar sample, NbOx-Dry-N2/H2, received the same treatment with heating in an N2/10% H2 atmosphere instead of air. BET measurements in both cases show a surface area of ~2 m2/g, with resistance readings equivalent to uncalcined $Nb_2O_5$. NbOx-Dry-N2/H2 becomes a black powder, while its equivalent calcined in air remains white following heat treatment. In neither case is the interior mesoporosity well exposed (as indicated by the low surface areas), though mesopores were formed as verified in the TEM. As shown in FIG. 9, pores on the order of 5-6 nm in diameter are clearly visible. However, the outer surface remains impermeable. The reducing calcination atmosphere in the NbOx-Dry-N2/H2 treatment, perhaps combined with trapped organic material, appears to have at least partially reduced niobia during the treatment, and also led to surface crystallization that is apparent from lattice fringes in TEM shown in FIG. 10. Analysis of these fringes (see FIG. 11) reveals reflections from (100) & (131)/(180) orthorhombic $Nb_2O_5$, as well as less coherent fringes more suggestive of the monoclinic phase. XPS of NbOx-Dry-N2/H2 shows the presence of Nb(IV) on the surface of the material, but it is likely the bulk remains as Nb(V) due to the high electrical resistance measurements ~$10^8\Omega$, consistent with reported values for $Nb_2O_5$ [(M. Vettraino M. L., 2000) (B. O. Skadtchenko, 2006)].

Once again omitting an acid washing step, NbRuyOz was calcined in air at 400° C. for 4 hours. Close examination of the powders reveals that particles with diameters in the range of 800 nm to 1.5 µm appear covered in ruthenium oxide crystals. EDS of one such particle shown in FIG. 12 indicates a ruthenium content of 31 wt %, twice the expected amount, assuming $RuCl_3$ was homogeneously mixed in the precursor solution.

Particles produced with a terminal calcination in N2/10% H2 (NbRuyOz-Dry-N2/H2) do not display the surface crystallization features that were seen with non-ruthenium containing particles under the same atmosphere (this observation is explained further in the subsequent section on XRD characterization). While all previous samples were electrically resistive, this material displayed no measurable resistance reading, and had a BET surface area of 9.3 m2/g.

Figure 12:
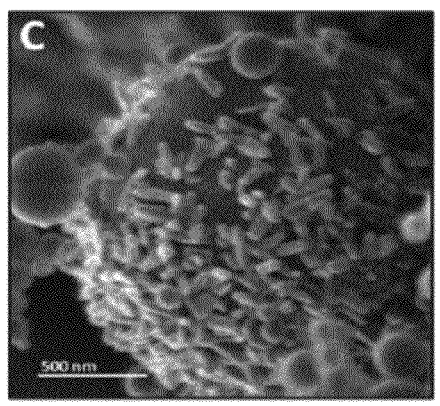
FIG. 12 is a scanning electromicrograph image of $NbRu_yO_z$ calcined in air without a washing step.

Despite the benefit of an acid washing step, it is obvious from NbRuyOz-Dry samples that an unwashed particle isn't completely impervious at higher temperature, due to the presence of $RuO_2$ surface crystals. The poly-disperse nature of the droplets allows for analysis of the impact of droplet/particle diameter. In none of the bi-metallic samples created do particles smaller than 260 nm have any ruthenium on their surface, nor does any appreciably appear in EDS measurements. Particles which are roughly 800 nm in diameter and larger consistently exhibit these crystals forming on their surface throughout the bulk of the powder. It is likely that in particles of smaller diameter, Ru species are able to diffuse to and escape from the surface in the form of vapor more quickly than in larger particles during calcination. When the system begins to cool, larger particles are more likely to have higher concentrations of ruthenia at their surface which had not yet vaporized during heating. Ruthenia vapor preferentially condenses onto its native RuOx-rich surface sites during cooling, while niobia prefers to remain highly oxidized. In addition, conditions are not homogenous for particles at different points inside the crucible during calcination. This fact, combined with the above potential temperature/diffusion effects, could result in particles with the properties we observe. EDS shows smaller particles to be without Ru content, while the particle in FIG. 12 is fairly representative of others of its size with ~31wt % Ru. Clearly, larger particles amass ruthenium which originated from those of smaller diameter.

Figure 13:
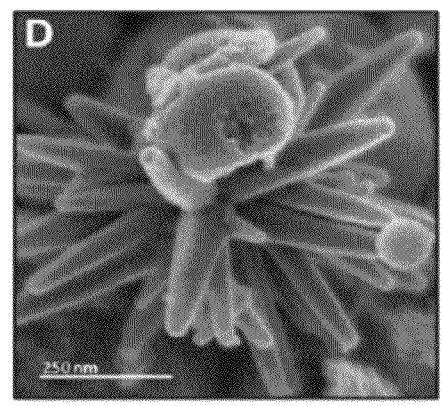
FIG. 13 is a scanning electromicrograph image of $NbRu_yO_z$ calcined in air with a washing step.

With the introduction of an acid washing step before calcination in air at 400° C. for 4 hours, NbRuyOz-Wash-Air shows a separation of niobium and ruthenium oxides into visibly distinct phases as seen in FIG. 13. It is speculated that, with an exposed interior due to washing away of surfactant template, volatile ruthenium species are able diffuse to the particle surface during calcination and take the form of Ru(IV) dendrites. Comparing against NbRuyOz-Dry-Air in which the formation of smaller surface crystals occurs, dendrites of $RuO_2$ appear to be a consequence of how quickly volatile ruthenium oxide diffuses to the particle surface. It is uncertain how impervious the particle surface remains without any washing. The question also remains of what role the pluronic surfactant may have in the diffusion of ruthenium or its behavior thereafter. It has been shown in similar systems that surfactant can aid in the formation of heterogeneous nucleation sites.

When the NbRuyOz is instead acid washed before reduction, particle coalescence (necking) is obvious in SEM. Compared to NbRuyOz-Dry-N2/H2, the material is still relatively conductive with a resistance of 950 Ohm, and a much improved BET surface area of 80 m2/g. EDS shows a smaller ruthenium content of 6%. Particle coalescence after the washing step is evidence of incomplete thermal decomposition after spray pyrolysis, allowing for partial destruction of the mesoporous structure as surfactant burns off and volatile ruthenium oxides vaporize during calcination/reduction. EDS shows that the junctions of coalesced particles are slightly more ruthenium rich, suggesting that ruthenium oxide reconstitutes more heavily in these spaces. Compared against the BET of mesoporous NbOx-Wash-Air, the damage to the mesostructure is a loss equivalent to ~100 m2/g of potential surface area.

Based on the attempts of the two previous samples exhibiting conductance, NbRuyOz was merely wet with 0.3M H2SO4 in order to etch the particle surfaces and expose the mesoporous interior without fully saturating the powder with solution. This was achieved by drop-wise addition of acid solution onto the powder inside a ceramic boat until all areas were wetted while maintaining the powder's original green color. Alternatively, complete saturation of the powder, as in the case of NbRuyOz-Wash-N2/H2, was marked by a color shift from green to black. The initial intent of the acid wash step was to etch surfactant in the outermost, lamellar surface and allow the reducing N2/H2 atmosphere to better reach the particle interior. However, it also appears that initial precursors are not entirely decomposed during spray pyrolysis. These un-reacted metal chlorides remain stable in the presence of small amounts of aqueous acid solution, but oxidize more completely when larger amounts of water are added. The remaining diffusive barrier after the wetting procedure was apparently enough to inhibit Ru volatilization sufficiently that particle coalescence and sizeable surface area loss was avoided. After the reduction, the resistance of NbRuyOz-Wash-N2/H2 was 2.3 Ohm, with a BET of 167 m2/g and 12 wt % Ru content as detected with EDS.

Higher electrical resistance and EDS readings of 6% Ru in NbRuyOz-Wash-N2/H2 suggest that roughly half of the original ruthenium content will vacate the bulk of the material during the course of the heating treatment necessary to remove most of the surfactant. SEM and TEM analysis confirm that a large phase separation occurs wherein Ru reforms into large, solid pieces of RuOX species, also contributing to a decrease from the expected surface area, whereas in the case of NbRuyOz-Wet-N2/H2, all Ru content appears retained (EDS 12 wt % Ru). Of the samples shown in Table I, we compare NbOx-Wash-Air as the optimal pure-niobia sample with NbRuyOz-Wet-N2/H2, the optimal bi-metallic oxide equivalent with enhanced electronic properties.

Figure 14:
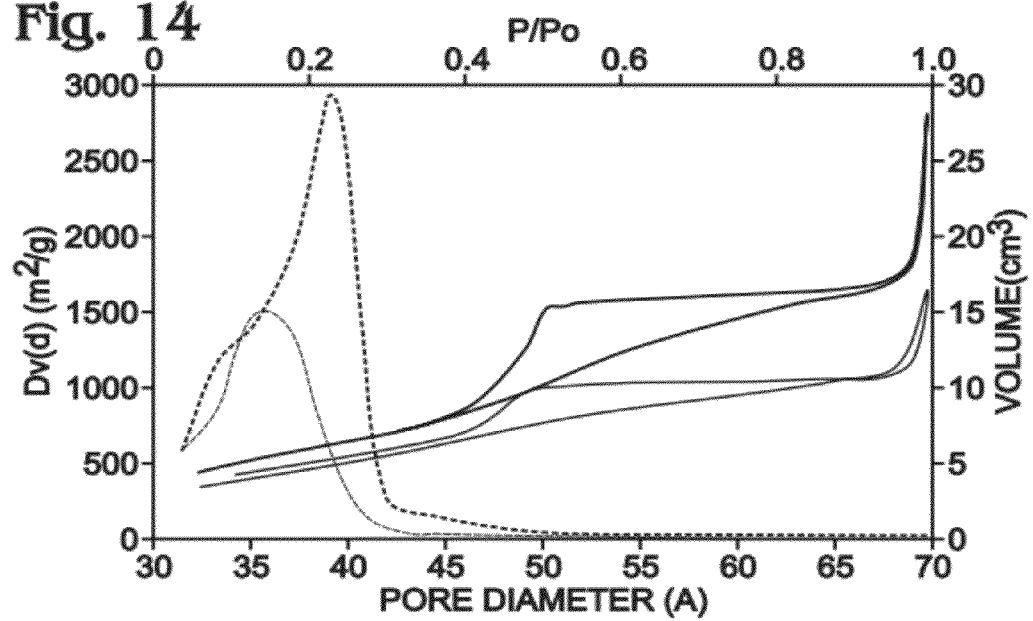
FIG. 14 is a graph showing the adsorption-desorption isotherms in $N_2$ (solid, top & right axis) and corresponding pore size distributions calculated by the BJH method (dotted, bottom & left axis) for $NbO_x$-Dry-Air (DARK) & $NbRu_yO_z$-Wet-$N_2/H_2$ (LIGHT).

Because electron microscopy provided no distinct difference between the structure of NbOx-Wash-Air and NbRuyOz-Wet-N2/H2, adsorption isotherms in N2 were obtained. The pure niobia sample has a pore size distribution centered around 3.9 nm while the niobia/ruthenia sample is at 3.6 nm (FIG. 14). Both values are smaller than the expected pore size of 7-10 nm characteristic of P123, although commercially available Nb(V) (surfactant-templated HY-340, CBMM) reports a mesoporosity of 3.8 nm. TEM micrographs show pores of the expected size, while calcination has typically been shown in literature to cause pores to grow [(Byongjin Lee T. Y., 2002)]. Despite the difference in pore size distributions, surface areas are very comparable at 183 m2/g and 167 m2/g for niobia and niobia/ruthenia, respectively. Notice in FIG. 14 that both samples exhibit significant hysteresis of type H1/H2 according to the IUPAC model, common for mesoporous oxides [(Li Yuan, 2008) (Byongjin Lee, 2002) (Byongjin Lee T. Y., 2002) (Junko N. Kondo, 2002) (Peidong Yang, 1999)]. But unlike the niobia sample, the adsorption and desorption curves of NbRuyOz-Wet-N2/H2 do not merge at low pressures. This repeatable result is possibly due to swelling of the mesostructure during adsorption, which further exposes interior porosity that was previously inaccessible. Hysteresis then results during desorption when some N2 is trapped within these pores.

Figure 7:
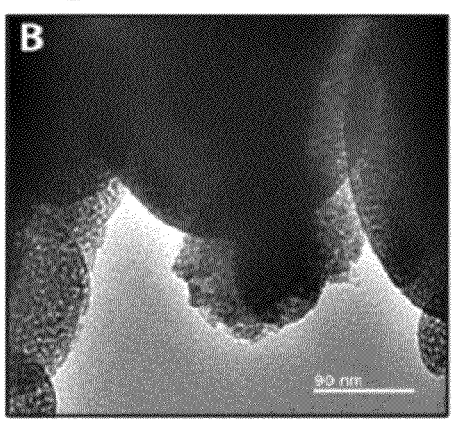
FIG. 7 is a STEM of $NbRu_yO_z$-Wet-$N_2/H_2$ calcined with a preceding acid washing step/

XRD was performed to further establish phase. A comparison of samples A and B in FIG. 7 shows two amorphous ranges of peak broadening in the case of each sample. The first range, from 16° to 40° (2θ), shows a distinguishable area of peaks around 35° which is slightly more distinct in the NbRuyOz sample. However, both spectra are comparable to that attained by others [(Bansal, 1994) (Peidong Yang, 1999)] for material containing only Nb(V), so this particular feature is likely not a consequence of ruthenium. It can be concluded that the electrical conductivity of NbRuyOz-Wet-N2/H2 is

TABLE I

| Sample ID | Elemental Content | Wash Step | Heating Step | BET ($M^2$/g) | Resistance ($\Omega$) | Color |
|---|---|---|---|---|---|---|
| Vulcan xc-72 | C, O | — | — | 200-250 | 0 | Black |
| RuO2 (J&J Mtrls.) | Ru, O | — | — | 122 | 0.4 | Black |
| Nb2O5 (HY340) | Nb, O | — | — | 183 | 8.30E+06 | White |
| NbOx-Dry-Air | Nb, O | Omitted | Air 10° C./min 400° C. 4 hr | 2 | 6.60E+06 | White |
| NbOx-Wash-Air | Nb, O | Excess Soln | Air 10° C./min 400° C. 4 hr | 183 | 8.40E+06 | White |
| NbOx-Dry-N2H2 | Nb, O | Omitted | N2/10%H2 - 10° C./min 400° C. 4 hr | 2 | 8.10E_06 | Black |
| NbOx-Wash-N2H2 | Nb, O | Excess Soln. | N2/10%H2 - 10° C./min 400° C. 4 hr | 131 | 7.90E_06 | Grey |
| NbRuyOz-Dry-Air | Nb, Ru, O | Omitted | Air 10° C./min 400° C. 4 hr | 2 | 8.20E_06 | Light Green |
| NbRuyOz-Wash-Air | Nb, Ru, O | Excess Soln. | Air 10° C./min 400° C. 4 hr | 164 | 8.20E_06 | Green |
| NbRuyOz-Dry-N2H2 | Nb, Ru, O | Omitted | N2/10%H2 - 10° C./min 400° C. 4 hr | 10 | 0.0 | Black |
| NbRuyOz-Wash-N2H2 | Nb, Ru, O | Excess Soln. | N2/10%H2 - 10° C./min 400° C. 4 hr | 80 | 950 | Black |
| NbRuyOz-Wet-N2H2 | Nb, Ru, O | Omitted | N2/10%H2 - 10° C./min 400° C. 4 hr | 167 | 2.3 | Black | not due to substantial crystallization of the major niobia phase, as the bulk of both samples are amorphous.

Figure 3:
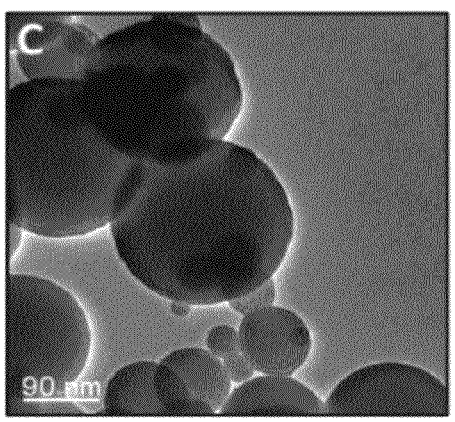
FIG. 3 is a scanning electron micrograph image of SEM $NbRu_yO_z$ calcined in air without a washing step.
Figure 4:
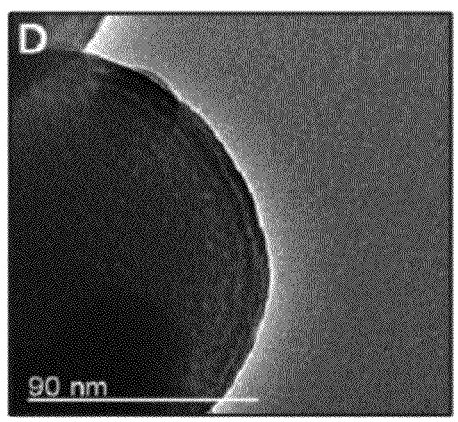
FIG. 4 is a scanning electron micrograph image of SEM $NbRu_yO_z$ calcined in air with a washing step.
Figure 5:
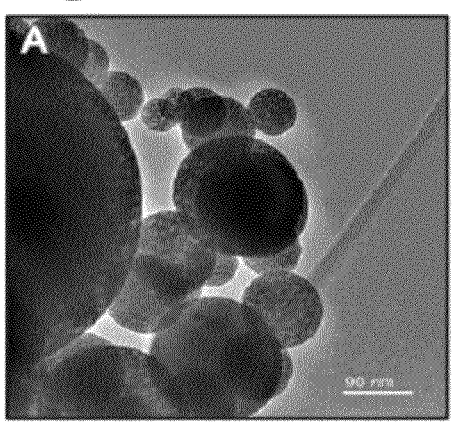
FIG. 5 is a scanning electron micrograph image of NbRuyOz particles.

Crystallization of $Nb_2O_5$ into an orthorhombic structure is known to begin shortly after 500° C. [(Frank Lenzmann, 2000) (R. Romero, 2004)], which is then followed by an irreversible transition to a monoclinic crystal state at ~900-1000° C. [(Bansal, 1994)]. For this reason, both samples were heated to 900° C. for 5 hours in N2 (FIGS. 3C&D). The inert atmosphere was necessary to allow the onset of this transition without additional oxidization of ruthenium from external oxygen sources. The result is two spectra with identically located peaks. Yet those of NbRuyOz-Wet-N2/H2 exhibit significantly lower intensity. This is a curious result for two reasons. First, despite the fact that the same amount of material under identical scanning parameters were used for all four spectra, the phase responsible for the peaks is present in FIG. 7 sample C in lesser quantity than in FIG. 7, sample D. If sample C were simply less crystalline, we would also expect to see broadening of the peaks, which we do not. This indicates that the peaks are not representative of the entire material, but merely of one of possibly several within the material. And because peaks are present in both samples, they are not directly attributable to ruthenium. The second curiosity lies in the fact that the amorphous features seen in samples A and B are not retained in samples C and D, possibly because the same phase is responsible for both and changes with the second round of heat treatment.

Due to the enhanced thermal sensitivity of nanoscopic features, and the observed crystalline features of NbOx-Dry-N2/H2 after calcination in a reducing atmosphere at 400° C., it is possible that a small degree of niobia crystallites are present in the other NbOx and NbRuyOz samples. Because it is more energetically favorable to grow available crystallites than for new sites to nucleate, the crystallites responsible for the amorphous peaks observed in FIG. 7 samples A and B quickly grow in size. We surmise that there is less of this crystalline niobia phase in the NbRuyOz sample. This is discussed further below.

Figure 15:
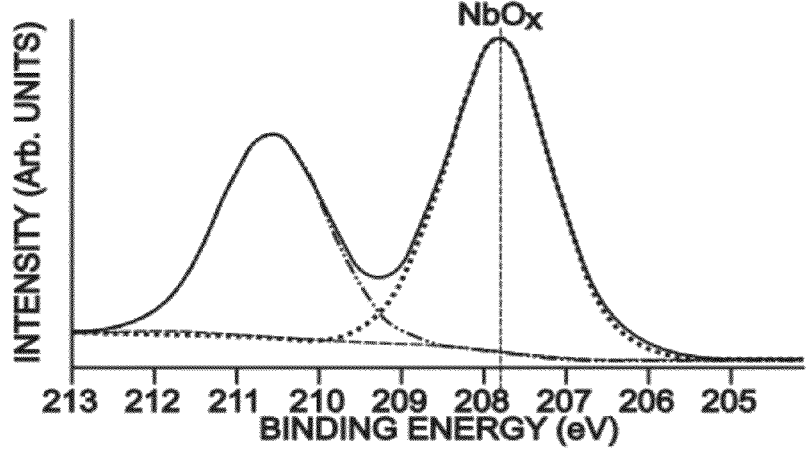
FIG. 15 is a graph showing high-resolution Nb 3d spectrum of $NbRu_yO_z$-Wet-$N_2/H_2$.
Figure 16:
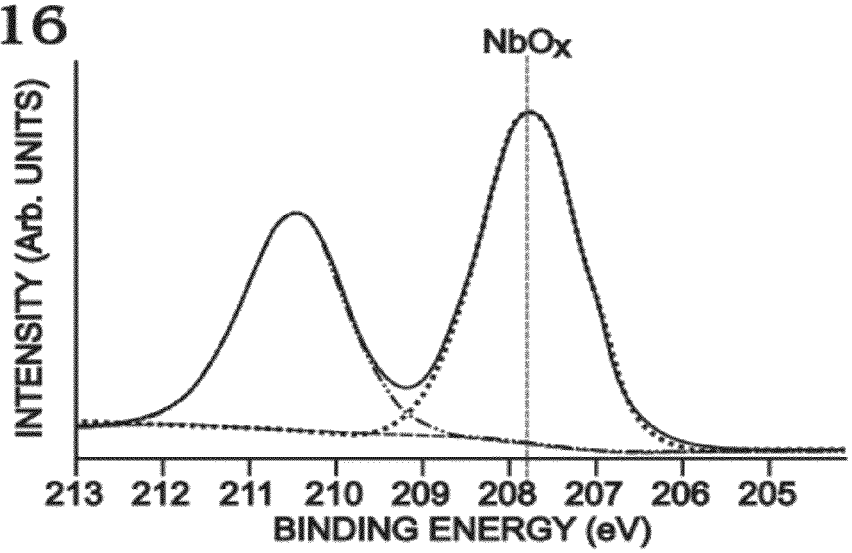
FIG. 16 is a graph showing high-resolution Nb 3d spectrum of $NbO_x$-Wash-Air
Figure 17:
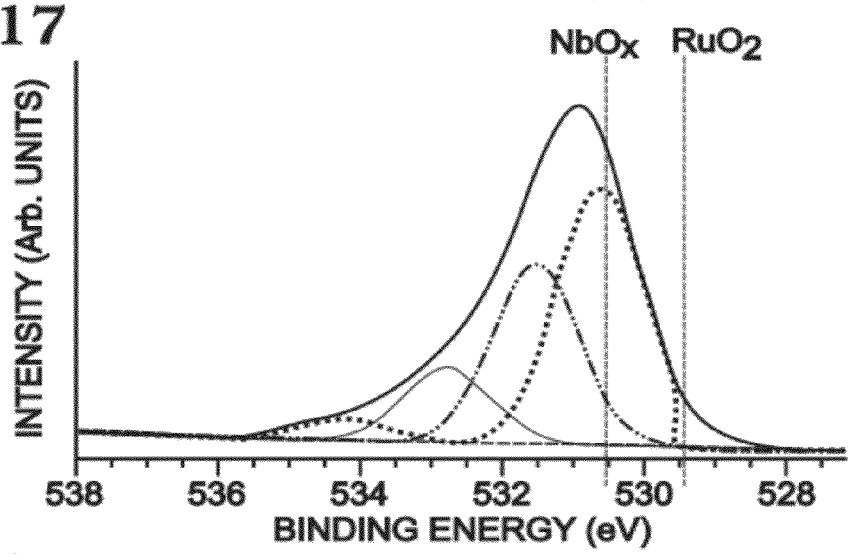
FIG. 17 is a graph showing high-resolution O is spectrum of $NbRu_yO_z$-Wet-$N_2/H_2$
Figure 18:
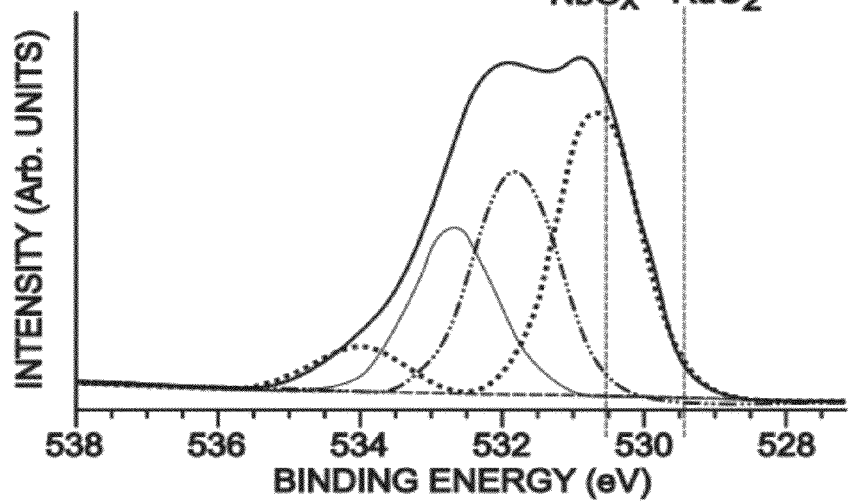
FIG. 18 is a graph showing high-resolution O is spectrum of $NbO_x$-Wet-Air

XPS high-resolution Ru3d, Nb3d and O1s spectra were acquired from NbOx-Dry-Air and NbRuyOz-Wet-N2H2 powders. Nb 3d spectrum acquired from both materials corresponds to $Nb_2O_5$ phase (FIGS. 15 and 16). The shape and position of Nb 3d spectra acquired from the NbRuyOz material (FIG. 15) is very similar to that of NbOx (FIG. 16), suggesting that the oxidation state of surface niobium in each are similar. O1s spectra and their curve-fits are shown in FIGS. 17 and 18. In O1s spectrum of the NbOx material (FIG. 18), the main peak is positioned at 530.6 eV and can be assigned to oxygen-bound to niobium in $Nb_2O_5$. The peak at 531.6 eV can be attributed to surface OH— species. The last two components, at 532.8 and 534 eV can be assigned to adsorbed H2O and/or C0 and CO2 species. The O1s spectrum of NbRuyOz (FIG. 17) material contains the same 4 peaks as that of the NbOx material. The main difference between the two materials is the amount of oxygen associated with OH—, adsorbed H2O and/or C0 and CO2. The post reductive treatment of the material at elevated temperature in N2/H2 atmosphere appears to result in a decrease of these species as compared to the post treatment in N2. Interestingly, the peak indicative of ruthenium oxide phase at lower binding energies is not present. Another source of information regarding the oxidation state of ruthenium can be obtained from Ru 3d spectrum. This, however, is not straightforward because the binding energies of ruthenium and carbon species are in the same binding energy window.

Figure 19:
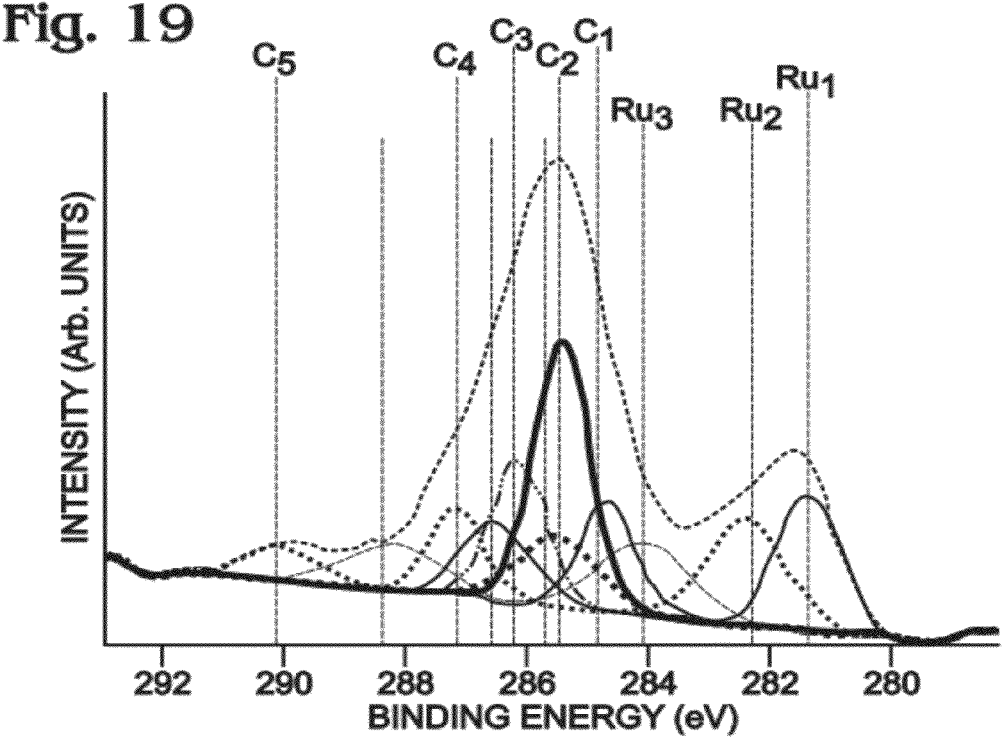
FIG. 19 is a graph showing high-resolution Ru 3d and C1s XPS spectra of $NbRu_yO_z$-Wet-$N_2/H_2$.
Figure 20:
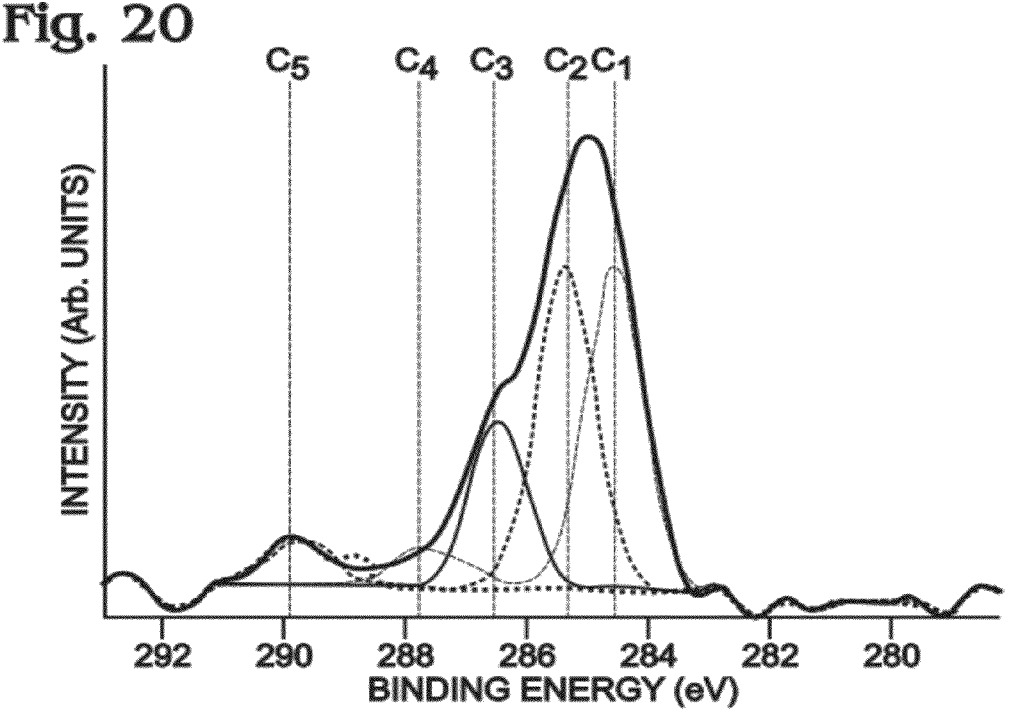
FIG. 20 is a graph showing high-resolution Ru 3d and C1s XPS spectra of $NbO_x$-Wash-Air.

High-resolution C1s and Ru 3d XPS spectra, displayed on the same graph due to their overlap, acquired from the NbRuyOz and NbOx materials are shown in FIGS. 19 and 20. Ru 3d spectra have 2 spin-orbit components corresponding to the Ru 3d5/2 (lower BE side of Ru 3d) and Ru 3d3/2 (higher BE side). The separation between these components is 4.2 eV. Three doublet peaks in the Ru 3d spectrum correspond to ruthenium components and 5 peaks correspond to carbon components. The carbon components present in the NbRuyOz material spectrum (FIG. 19) strongly coincide with carbon components present in the C1s spectrum of the NbOx material (FIG. 20), which doesn't have contributions from ruthenium. Typically, BE of 5/2 component of metallic ruthenium lies in the 279.8-280.2 eV range and that of ruthenium in $RuO_2$ is in the range 280.5-281.0 eV. The first ruthenium component in Ru 3d spectrum of the NbRuyOz material is at 281.3 eV, which is significantly higher than expected for metallic ruthenium and slightly higher than expected for $RuO_2$. This peak also cannot be assigned to a higher oxidation state. The second ruthenium peak in Ru 3d spectrum is around 282.3 eV and can be assigned to hydrous ruthenium (IV) oxide. The third peak is around 284 eV and is due to $RuO_4$. The absence of the $RuO_2$ peak in the O1s spectrum, as well as the slightly higher than expected BE of the first ruthenium peak for $RuO_2$, can be explained by the formation of a mixed oxide phase. It is possible that incorporation of $RuO_2$ into the $Nb_2O_5$ phase results in a shift of BE of ruthenium to higher values and BE of oxygen bonded to ruthenium to the BE of oxygen bonded to niobium. Another observation that supports incorporation of ruthenium oxide into the niobium oxide matrix is the ratio of oxygen bound to niobium (from O1s spectrum) to niobium. In the NbOx material $OxygenNb_2O_5/NbNb_2O_5$ is around 2.7, which is very close to the stoichiometry of $Nb_2O_5$. In comparison, the same ratio in the NbRuyOz material is around 1.9, and would be even lower were ruthenium content also considered. This means that the average number of oxygen atoms per metal atom in the NbRuyOz material is close to the stoichiometry of IV valency metal oxides.

Figure 6:
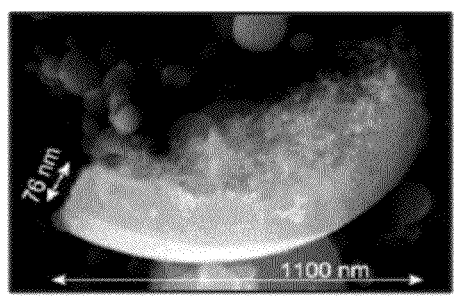
FIG. 6 is a scanning electron micrograph image of a particle fragment of $NbRu_yO_z$-Dry-Air.

Thermogravimetric analysis was performed to mimic the entire post-treatment process of NbOx-Wash-Air and NbRuyOz-Wet-N2/H2 and determine any critical temperatures and phase transitions for both systems. After heating to 400° C. for 4 hours in their respective atmospheres, both samples were further ramped at 10° C./min to 1500° C. in an N2 atmosphere (FIGS. 6A&B). Weight decrease from 20-300° C. can be attributed to loss of residual water and alcohol within the mesopores of the material, as well as initial loss of surfactant. The rate of loss in NbRuyOz-Wet-N2/H2 is equivalent to that of NbOx-Wash-Air, though delayed by roughly 60° C. Much of the ruthenium content is in the form of hydrous $RuO_2$, wherein water remains stable for slightly longer [(Svitlana Pylypenko, 2009) (Debra R. Rolison, 1999)]. Dehydration continues to 400° C. and perhaps beyond. Early loss of P123 surfactant is expected to begin around 200° C. and finish within the 4 hour period held at 400° C. Throughout this holding period, both samples decrease equally in weight, suggesting that their different atmospheres do not determine which or to what degree volatile species are purged from the materials.

Figure 21:
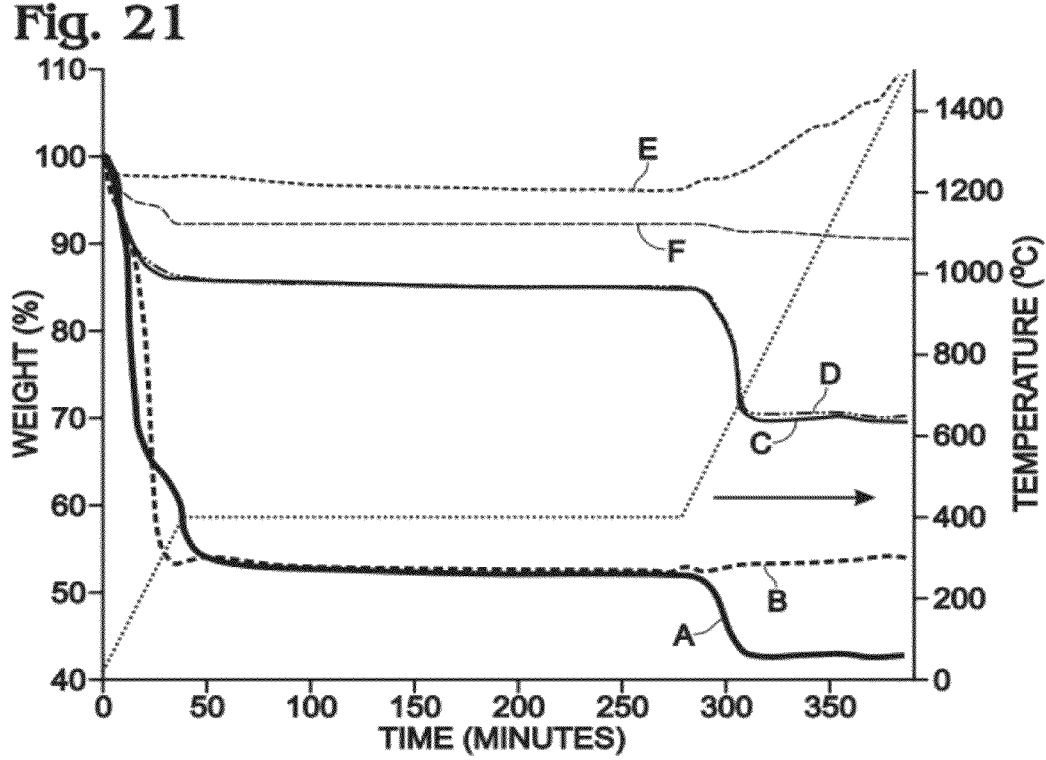
FIG. 21 is a graph showing thermogravimetric Analysis of $NbO_x$-Wash & $NbRu_yO_z$-Wet under the same conditions experienced during post-treatment.

Once heating again began in N2, pure niobia lost an additional 17.2% from 480° C. to 700° C., attributable to the burning of residual organics which were observed in XPS, as shown in FIG. 21. The samples shown in FIG. 21 were ramped at 10° C./min to 400° C. in their respective atmospheres where they were held for 4 hours. All samples were then exposed to an $N_2$ atmosphere during heating from 400° C. to 1500° C. at the same ramp rate. At temperatures of 400° C. and below, $NbO_x$-Wash was in air (A), $NbRu_yO_z$ was in $N_2/10\%$ $H_2$ (B), previously post-treated $NbO_x$-Wash-Air was in air (C) and $N_2/10\%$ $H_2$ (D), and previously post-treated $NbRu_yO_z$-Wash-$N_2/H_2$ (E) and $NbRu_yO_z$-Wet-$N_2/H_2$ (F) we both in $N_2$.

The same organics combust rapidly in NbRuyOz-Wet-N2/H2, causing the disturbance in the weight reading (a repeatable effect). This is followed by a steady weight increase of 2% to 1500° C. Non-UHP compressed N2 is known to contain small levels of O2 which are responsible for oxidation of the sample and its organics, and the resulting weight gain seen here. Curves (C) & (D) represent niobia which was previously calcined to 400° C., yet was put through the calcination treatment a second time followed by heating to 1500° C. The atmospheres of (C) & (D) were air and N2, respectively. Initial water losses of 13% from 20-400° C. represent only what the material was able to adsorb in several weeks of exposure to the atmosphere after being synthesized and calcined. From 480° C. to 700° C. there are two distinct slopes of weight loss, with the total loss equal to curve (A). From previous, detailed TGA studies of niobia done by others [(Bansal, 1994), Domen-02], we surmise that the first slope is from the decomposition of surface bicarbonates which form CO2 and H2O, while the second is from burning of residual organics. Combustion of carbon with oxygen weakly bound to the metal-oxide surface has been observed to slightly reduce the sample further, although the majority of weight loss is likely from carbon reacting with O2 impurities in the gas stream alone. Curves (C) & (D) have bicarbonate formation on their surface due to the exposure of residual organics to atmosphere before being heated in the TGA. In contrast, (A) was exposed only to N2 after being collected from the filter paper as an uncalcined product. Though bicarbonate species do exist in (A), their decomposition is indistinguishable from other remaining organics. Curves (E) & (F) represent NbRuyOz-Wash-N2/H2 with 6% Ru and NbRuyOz-Wet-N2/H2 with 12 wt % Ru, respectively. Oxidation occurs more rapidly in the sample which is initially more reduced thanks to its greater ruthenium content. Because these samples were loaded into the TGA in a state equivalent to Nb(IV), they begin oxidizing to Nb(V), niobia's preferred valence within this temperature range.

At temperatures greater than 700° C., any observable change in weight remains attributable to the effect mentioned above. Curves (A), (C) & (D) consistently show a very gradual weight increase which peaks at 1150° C. before again returning to the weight observed at 700° C. A shift in crystal structure of niobia from orthorhombic to a monoclinic unit is expected to begin at ~900° C. It has been shown that TGA behavior, as well as the general properties of niobia in this temperature range vary widely depending upon preparation history of the material [(Bansal, 1994) (Jih-Mirn Jehng, 1991)]. So despite their similar composition yet varying behavior above 700° C., it is not unreasonable to assign the changes of both samples to the same crystallographic transition.

Figure 22:
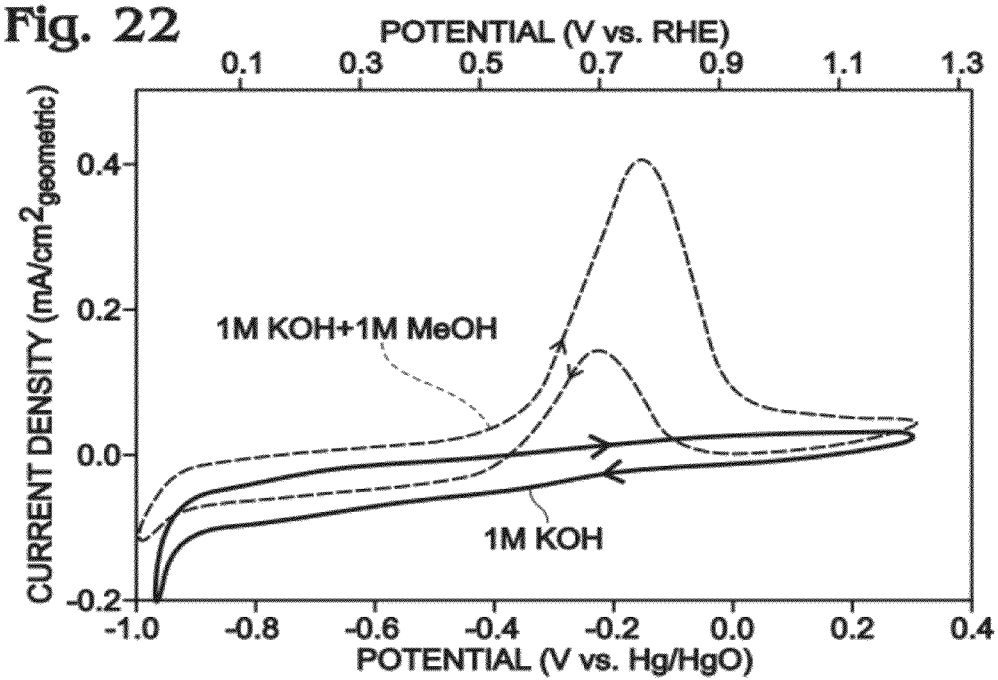
FIG. 22 is a graph of cyclic voltammegrams of 128 μg/$cm^2$ $NbRu_yO_z$-Wet-$N_2/H_2$ initially in 1M KOH solution, and then with 1M methanol added. Scan rate of 10 mV/s vs. Hg/HgO reference electrode.

Niobia without ruthenium is extremely difficult to reduce and is too electrically resistive to exhibit observable electrochemical activity. For this reason, only $NbRu_yO_z$-Wet-$N_2/H_2$ is discussed here. Cyclic voltammetry in Ar-saturated 1M KOH was used to address the feasibility of using $NbRu_yO_z$ materials as a support for anode catalysts in fuel cells. Within the given range of potential of the cyclic voltammogram shown in FIG. 22, there are no pronounced features until $H_2$ evolution at about −0.9V. This indicates an absence of anion or cation adsorption on the electrode. Upon addition of methanol, the oxidative process indicates oxidation of methanol on the $NbRu_yO_z$ material. This shows that, unlike carbon, $NbRu_yO_z$ support material does have a participatory role in the process of fuel oxidation. The onset of the oxidation process is expected to improve as a decorating Pt phase is incorporated on the support material.

The following references are referred to in the above description and/or are incorporated by reference:

B. O. Skadtchenko, D. A. (2006). 2005 Pure or Applied Inorganic Chemistry Award Lecture—Host-guest inclusion chemistry of electroactive, mesoporous transition metal oxides and 1-D confinement in one step and why amorphous is better. Can. J. Chem., 84, 371-383.

Bansal, N. (1994). Synthesis and Thermal Evolution of Structure in Alkoxide-Derived Niobium Pentoxide Gels. Journal of Materials Science, 29, 4481-4486.

Brenda L. Garcia, R. F. (2007). Low-Temperature Synthesis of a PtRu/Nb0.1Ti0.902 Electrocatalyst for Methanl Oxidation. Electrochemical and Solid State Letters, 10 (7), B108-B110.

Byongjin Lee, D. L. (2002). Three-Dimensionally Ordered Mesoporous Niobium Oxide. Journal of the American Chemical Society, 124, 11256-11257.

Byongjin Lee, T. Y. (2002). Single-Crystal Particles of Mesoporous Niobium-Tantalum Mixed Oxide. Chem. Mater., 14, 867-875.

C. Jeffrey Brinker, Y. L. (1999). Evaporation-Indurced Self-Assembly: Nanostructures Made Easy. Advanced Materials, 11 (7), 579-585.

David M. Antonelli, A. N. (1996). Ligand-Assisted Liquid Crystal Templating in Mesoporous Niobium Oxide Molecular Sieves. Inorg. Chem., 35, 3126-3136.

Debra R. Rolison, P. L. (1999). Role of Hydrous Ruthenium Oxide in Pt—Ru Direct Methanol Fuel Cell Anode Electrocatalysts: The Importance of Mixed Electron/Proton Conductivity. Langmuir, 15, 774-779.

Dong-Soo Yoon, H. K.-M. (2001). Amorphous Ta-Nanocrystalline RuOx Diffusion Barrier for Lower Electrode of High Density Memory Devices. Journal of Electronic Materials, (5), 493-502.

Frank Lenzmann, V. S. (2000). Mesoporous Nb2O5 Films: Influence of Degree of Crystallinity on Properties. Journal of Sol Gel Science and Technology, 19, 175-180.

Gary L. Messing, S.-C. Z. (1993). Ceramic Powder Synthesis by Spray Pyrolysis. J. Am. Ceram. Soc., 76 (11), 2707-2726.

Hector R. Colon-Mercado, B. N. (2005). Stability of Platinum Based Alloy Cathode Catalysts in PEM Fuel Cells. Journal of Power Sources, 155, 253-263.

J. M. Jaksic, C. L. (2008). Chemical Industry & Chemical Engineering Quarterly, 14 (2).

Jih-Mirn Jehng, I. E. (1991). Structural Chemistry and Raman Spectra of Niobium Oxides. Chem. Mater., 3, 100-107.

Junko N. Kondo, Y. T. (2002). Synthesis and Property of Mesoporous Tantalum Oxides. Topics in Catalysis, 19 (2), 171-177.

K. Sasaki, L. Z. (2008). Niobium Oxide-Supported Platinum Ultra-Low Amount Electrocatalysts for Oxygen Reduction. Phys. Chem. Chem. Phys., 10, 159-167.

K. Sasaki, R. A. (2008). Journal of the Electrochemical Society, 155 (2).

Karl J. J. Mayrhofer, S. J. (2008). Non-destructive transmission electron microscopy study of catalyst degradation under electrochemical treatment. Journal of Power Sources, 185, 734-739.

Kyung-Won Park, K.-S. S. (2007). Nb—TiO2 Supported Pt Cathode Catalyst for Polymer Electrolyte Membrane Fuel Cells. Electrochemistry Communications, 9, 2256-2260.

Li Yuan, V. V. (2008). Mesoporous Niobium Oxides with Tailored Pore Structures. Journal of Materials Science, 43, 6278-6284.

M. Vettraino, M. L. (2000). Synthesis and Electronic Properties of Reduced Mesoporous Sodium Niobium Oxides. Advanced Materials, 12 (5), 337-341.

M. Vettraino, M. T. (2001). Synthesis and Characterization of a New Family of Electroactive Alkali Metal Doped Mesoporous Nb, Ta, and Ti oxides and Evidence for an Anderson Transition in Reduced Mesoporous Titanium Oxide. Inorg. Chem., 40, 2088-2095.

Peidong Yang, D. Z. (1999). Block Copolymer Templating Syntheses of Mesoporous Metal Oxides with Large Ordering Lengths and Semicrystalline Framework. Chem. Mater., 11, 2813-2826.

R. Romero, J. R.-B. (2004). Nb2O5 Thin Films Obtained by Chemical Spray Pyrolysis. Surface and Interface Analysis, 36, 888-891.

S. Guerrero, J. M. (2007). Activity and Selectivity Control by Niobium for the Preferential Oxidation of CO on Pt Supported Catalysts. Applied Catalysis A: General, 328, 27-34.

Svitlana Pylypenko, B. B. (2009, February 19). Composition- and Morphology-Dependent Corrosion Stability of Ruthenium Oxide Materials. ACS Applied Materials & Interfaces.

T. B. Massalski, H. O. (1990). Binary Alloy Phase Diagrams. Materials Park, Ohio: ASM International.

Wu Bi, T. F. (2008). Temperature Effects on PEM Fuel Cells Pt/C Catalyst Degradation. Journal of the Electrochemical Society, 155 (2), B215-B221.

Yoshihide Senzaki, M. J.-S. (1995). Preparation of Metal Ruthenates by Spray Pyrolysis. Journal of the American Ceramic Society, 78 (11), 2977-83.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a host cell" includes a plurality (for example, a culture or population) of such host cells, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed is:

1. A method for forming mesoporous conductive niobium particle comprising:
   atomizing a precursor solution comprising niobium precursor, a solvent, and a surfactant to form aerosolized liquid precursor droplets;
   evaporating the solvent within the liquid precursor droplets in such a manner that a surfactant-related mesostructure is locked within a solid droplet surface;
   thermally decomposing the droplets to form a powder; and
   post-processing the powder to produce mesoporous conductive niobium particles wherein the post-processing comprises removing an impermeable exterior layer of oxide material by acid washing before the surfactant is completely removed and calcination.

2. The method of claim 1 wherein the post-processing step exposes the interior mesostructure of the particle.

3. The method of claim 1 wherein the precursor solution further comprises a ruthenium precursor.

4. The method of claim 3 wherein the acid washing comprises wetting the thermally decomposed droplets with acid to etch the particle surface and expose the mesoporous interior without fully saturating the powder.

5. The method of claim 1 wherein the precursor solution further comprises a carbon slurry.

* * * * *